(12) United States Patent
Sapp et al.

(10) Patent No.: US 11,055,624 B1
(45) Date of Patent: Jul. 6, 2021

(54) PROBABILISTIC HEAT MAPS FOR BEHAVIOR PREDICTION

(71) Applicant: Zoox, Inc., Menlo Park, CA (US)

(72) Inventors: Benjamin Sapp, San Francisco, CA (US); Yilun Wang, San Francisco, CA (US); James William Vaisey Philbin, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 482 days.

(21) Appl. No.: 15/807,521

(22) Filed: Nov. 8, 2017

(51) Int. Cl.
*B60W 30/00* (2006.01)
*G06N 7/00* (2006.01)
*G05D 1/00* (2006.01)
*G06N 5/04* (2006.01)

(52) U.S. Cl.
CPC ........... *G06N 7/005* (2013.01); *G05D 1/0088* (2013.01); *G06N 5/047* (2013.01)

(58) Field of Classification Search
CPC ...... G01C 21/165; G01C 21/30; G01C 21/20; G01C 21/005; G01C 21/00; G01C 21/28; G01C 21/26; G01C 21/16; G01C 21/32; G01C 3/08
See application file for complete search history.

(56) References Cited

U.S. PATENT DOCUMENTS

| 6,819,779 | B1 * | 11/2004 | Nichani | G06K 9/00798 382/104 |
| 2007/0078601 | A1 * | 4/2007 | Nakano | B60W 30/16 701/301 |
| 2018/0003516 | A1 * | 1/2018 | Khasis | G08G 1/20 |
| 2018/0326982 | A1 * | 11/2018 | Paris | G05D 1/0088 |
| 2019/0108753 | A1 * | 4/2019 | Kaiser | B60Q 1/08 |

FOREIGN PATENT DOCUMENTS

EP   2006181 A2 * 12/2008 ............... B60T 7/22
JP   2009069160 A * 4/2009

* cited by examiner

*Primary Examiner* — Tuan C To
*Assistant Examiner* — Paul A Castro
(74) *Attorney, Agent, or Firm* — Lee & Hayes, P.C.

(57) ABSTRACT

The generation and/or use of probabilistic heat maps for use in predicting the behavior of entities in an environment is described. In an example, a computing device(s) can receive sensor data from sensors of a vehicle in an environment. The computing device(s) can determine, based at least in partly on the sensor data, a location of an entity in the environment, and a first characteristic associated with the entity or the environment (type, velocity, orientation, etc.). The computing device(s) can access, from a database, a heat map generated from previously collected sensor data associated with the environment. The computing device(s) can perform a look-up using the heat map based at least partly on the location of the entity and the first characteristic, and can determine a predicted behavior of the entity at a predetermined future time based on a pattern of behavior associated with a cell in the heat map.

20 Claims, 7 Drawing Sheets

PROBABILISTIC HEAT MAPS FOR BEHAVIOR PREDICTION

BACKGROUND

Prediction techniques are used to determine future states of entities in an environment. That is, prediction techniques are used to determine how a particular entity is likely to behave in the future. Currently, prediction techniques involve physics-based modeling or rules-of-the-road simulations to predict future states of entities in an environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
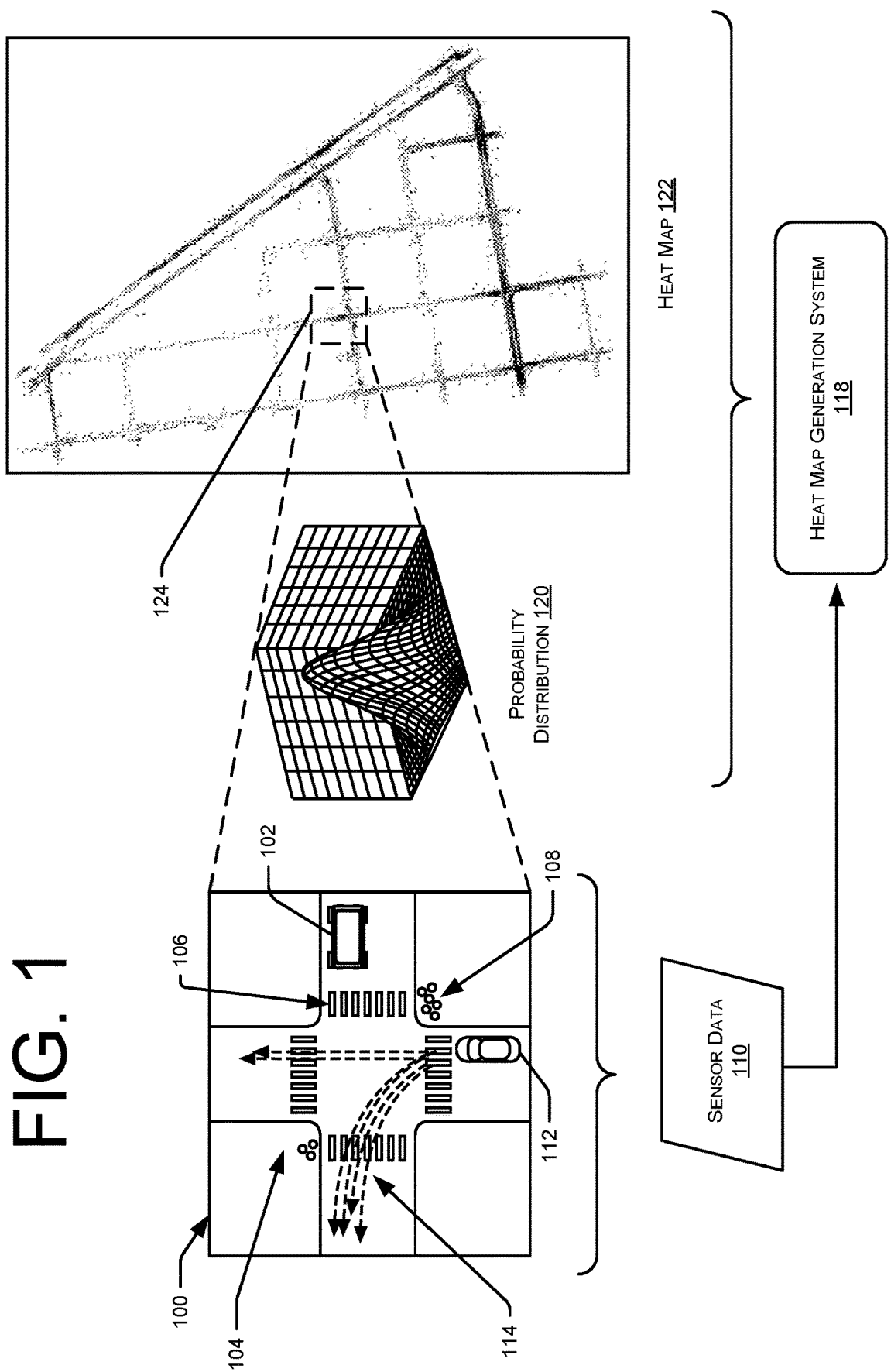
FIG. 1 is a schematic diagram illustrating an example process for generating a heat map as described herein.

Techniques described herein are directed to utilizing probabilistic heat maps to predict entity behavior. For the purpose of this discussion, a heat map is a multi-dimensional data structure. In at least one example, each dimension of the multi-dimensional data structure can correspond to a characteristic associated with an entity and/or an environment in which the entity is positioned. For instance, a dimension can correspond to a characteristic associated with an entity in the environment (e.g., x-position, y-position, z-position, orientation, velocity, entity type, etc.) or a characteristic associated with the environment itself (e.g., a time of day, a day of a week, a season, a weather condition, a presence of another entity in the environment, a state of an entity in the environment, an indication/level of darkness/light, etc.).

In at least one example, previously collected sensor data (e.g., from sensor(s) associated with a fleet of vehicles, etc.) can be used to determine patterns of behavior associated with entity(s) having a same entity type (e.g., cars, pedestrians, cyclists, etc.) in a particular location. A pattern of behavior can be associated with a cell in a heat map, which can be stored for subsequent use. At a later time, one or more sensors associated with a vehicle can generate sensor data, which can be used to determine a presence of an entity proximate to the vehicle and classification of the entity. Additionally, in at least one example, the sensor data can be processed to determine the location of the entity. Furthermore, in some examples, the sensor data can be processed to determine one or more characteristics associated with the entity and/or the environment in which the entity is positioned. Computing device(s) onboard the vehicle can access the previously generated heat map and retrieve data indicative of a pattern of behavior associated with the detected entity (based on the entity type, location, and/or one or more characteristics). Then, the computing device(s) can leverage the pattern of behavior to predict how the detected entity is likely to behave, and to determine how the vehicle should navigate the environment.

As a non-limiting example, computing device(s) onboard one or more vehicles can collect sensor data associated with a particular roadway intersection that has a pothole in the roadway intersection. Behavior data derived from the sensor data can indicate that vehicles driving through the roadway intersection drive around the pothole. Such a pattern of behavior can be associated with a cell in a heat map that indicates how entities of a particular type (e.g., vehicles) behave at a particular future time (e.g., one second, five seconds, etc.) at the particular roadway intersection. In at least one example, the cell can be associated with a particular x-location, y-location, and one or more characteristics (e.g., of the entity and/or the environment).

At a later time, a vehicle can approach the particular roadway intersection. Computing device(s) onboard the vehicle can leverage sensor data collected from one or more sensors onboard the vehicle to determine a location of the vehicle and the presence of an entity in the particular roadway intersection. In an example, the computing device(s) can classify the entity to determine the entity type (e.g., a vehicle). Furthermore, the computing device(s) can determine the presence of one or more other characteristics (e.g., associated with the other vehicle and/or the environment). The computing device(s) can utilize the location, the entity type, and/or one or more other characteristics to locate a cell in the heat map that indicates a pattern of behavior of entities having the same entity type (e.g., vehicle) in the particular roadway intersection. The computing device(s) can use the pattern of behavior to predict a behavior of the other vehicle at a particular future time (e.g., one second, five seconds, etc.). Accordingly, the computing device(s) can utilize the pattern of behavior to predict how the other vehicle is likely to behave and can utilize the prediction to inform one or more systems of the vehicle. For instance, in at least one example, the computing device(s) can utilize the prediction to generate a trajectory along which the vehicle can drive. That is, the computing device(s) can utilize the prediction to determine how the vehicle should respond to the other vehicle in the particular roadway intersection.

The heat maps described herein can reduce the amount of storage required to utilize sensor data for prediction. That is, without processing the sensor data collected over time such to identify a statistically significant value to represent the sensor data, the computing device(s) would need to store all of the sensor data to use it for predictive purposes. Storing such sensor data would require a substantial amount of storage. However, by utilizing probabilistic modeling to summarize the sensor data and associating a resulting representative indication in a cell of a heat map, computing device(s) can utilize sensor data for prediction without requiring such a substantial amount of storage. That is, by using the heat map as a look-up table, computing device(s) can store less data and still utilize sensor data for prediction.

While the disclosure herein is directed to predicting behaviors of entities in an environment in which a vehicle is driving, techniques described herein can be applicable in other environments as well. For instance, techniques described herein can be applicable to collecting, analyzing, and storing data associated with the behavior of consumers in a shopping mall (e.g., shopping traffic trends), animals in an outdoor environment (e.g., migration trends), vehicles and/or pedestrians on public roads (e.g., traffic/pedestrian flow), etc. That is, the techniques described herein are not limited to predicting the behaviors of entities in an environment where a vehicle is driving.

FIG. 1 is a schematic diagram illustrating an example process 100 for generating a heat map as described herein. FIG. 1 depicts an environment 100 through which an example vehicle 102 travels. The environment 100 can correspond to a particular location (or multiple particular locations) in a larger (global) environment. For illustrative purposes, the environment 100 is associated with a roadway intersection 104. The roadway intersection 104 includes crosswalks 106 to enable pedestrians 108 and/or cyclists (not illustrated in FIG. 1) to cross respective portions of the roadway intersection 104.

For the purpose of illustration, the vehicle 102 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In that case, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled.

The example vehicle 102 shown in FIG. 1 is an automobile having four wheels. Other types and configurations of vehicles are contemplated, such as, for example, vans, sport utility vehicles, cross-over vehicles, trucks, buses, agricultural vehicles, and construction vehicles. The vehicle 102 can be powered by one or more internal combustion engines, one or more electric motors, hydrogen power, any combination thereof, and/or any other suitable power sources. In at least one example, the vehicle 102 can be associated with one or more sensors which can be used to generate sensor data 110. The one or more sensors can include light detection and ranging (LIDAR) sensors, radio detection and ranging (RADAR) sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), etc. Additional details associated with the vehicle 102 are described below.

In at least one example, computing device(s) associated with the vehicle 102 can process the sensor data 110 locally (as described below) and/or can send the sensor data 110 to one or more servers (not illustrated in FIG. 1) for storing and/or processing. Overtime, as the one or more sensors associated with the vehicle 102 and/or additional vehicles (or other sensor data collecting devices) collect data, computing device(s) associated with the vehicle 102 and/or additional vehicles (or other sensor data collecting devices) can send sensor data 110 to the one or more servers. The one or more servers can store and/or process the sensor data 110, as described below.

In at least one example, the one or more servers can process the sensor data 110. In some examples, the one or more servers can determine a behavior of an entity 112 associated with a particular entity type based on the sensor data 110. That is, the one or more servers can analyze sensor data associated with a particular period of time to determine how entity(s) in an environment behave during the period of time. Dashes lines 114 illustrate various behaviors of entities having a same entity type (e.g., a vehicle) as the vehicle 112, as determined from sensor data 110. In at least one example, data indicative of a behavior of an entity (e.g., vehicle 112) associated with an entity type, as determined from sensor data 110, can be associated with an observation.

In at least one example, a heat map generation system 118 associated with the one or more servers can aggregate observations associated with entities (or respective environments) sharing one or more characteristics and can perform a statistical analysis on the aggregated data to identify patterns of behavior exhibited by individual entities associated with the one or more characteristics. In at least one example, at least one of the one or more characteristics can be an entity type. Additionally and/or alternatively, in at least one example, at least one of the one or more characteristics can be an x-position and another of the characteristics can be a y-position of an entity. That is, the patterns of behavior can be associated with entities having a same entity type in a location (associated with the x-position and y-position). In some examples, additional and/or alternative of the one or more other characteristics can be used to aggregate data for performing the statistical analysis. In at least one example, the heat map generation system 118 can analyze the observations such to generate a probability distribution from which patterns of behavior can be determined. A non-limiting example of a probability distribution 120 is depicted in FIG. 1.

In at least one example, the heat map generation system 118 can analyze the probability distribution 120 to determine an average, a median, a maximum, a minimum, or other statistically significant value to determine a pattern of behavior that is representative of an entity type, that is associated with the same one or more characteristics, in the location. In at least one example, the pattern of behavior can indicate a pose (e.g., location, orientation, etc.) of entities having an entity type (e.g., a vehicle, a pedestrian, a cyclist, etc.) at a predetermined future time (e.g., two seconds, five seconds, etc.), an intended destination of entities having the entity type, a position, velocity, and/or acceleration of an entities having the entity type at a predetermined future time, a semantic action (e.g., continue straight, follow sidewalk, hold still, etc.), etc.

The heat map generation system 118 can leverage the pattern of behavior to generate a heat map. A non-limiting example of a heat map 122 is illustrated in FIG. 1. In at least one example, the heat map generation system 344 can associate data indicative of the pattern of behavior with a cell in a heat map. In at least one example, the heat map generation system 344 can determine a cell in a heat map associated with two or more characteristics associated with the entity and/or the environment. In an example, the heat map can be associated with an entity type and the cell can be associated with a location of an entity (e.g., the x-position and the y-position) and one or more other characteristics. Based at least in part on identifying a cell, the heat map generation system 344 can associate data representative of the determined pattern of behavior for the entity type with the cell. In at least one example, the cell can correspond to an area of the environment that is determined based on GPS coordinates or a semantic map. Dashed box 124 is a non-limiting example of a cell of the heat map 122. That is, dashed box 124 corresponds to a cell of the heat map 122, and data associated with the cell of the heat map 122 can be determined based on the probability distribution 120 derived from the sensor data 110. The data associated with the cell can be indicative of the determined pattern of behavior for the entity type (e.g., vehicle) associated with the one or more characteristics and in the location. Such data can be utilized by a prediction system of a vehicle 102 to determine how an entity associated with the same entity type and one or more other characteristics is likely to behave in the location, as described below with respect to FIG. 2.

It should be noted that different entity types can be associated with different heat maps. Accordingly, a heat map associated with the pedestrians 108 can be indicative of different behavior patterns associated with pedestrians 108, instead of behavior patterns associated with vehicles, as represented in the heat map 122.

Figure 2:
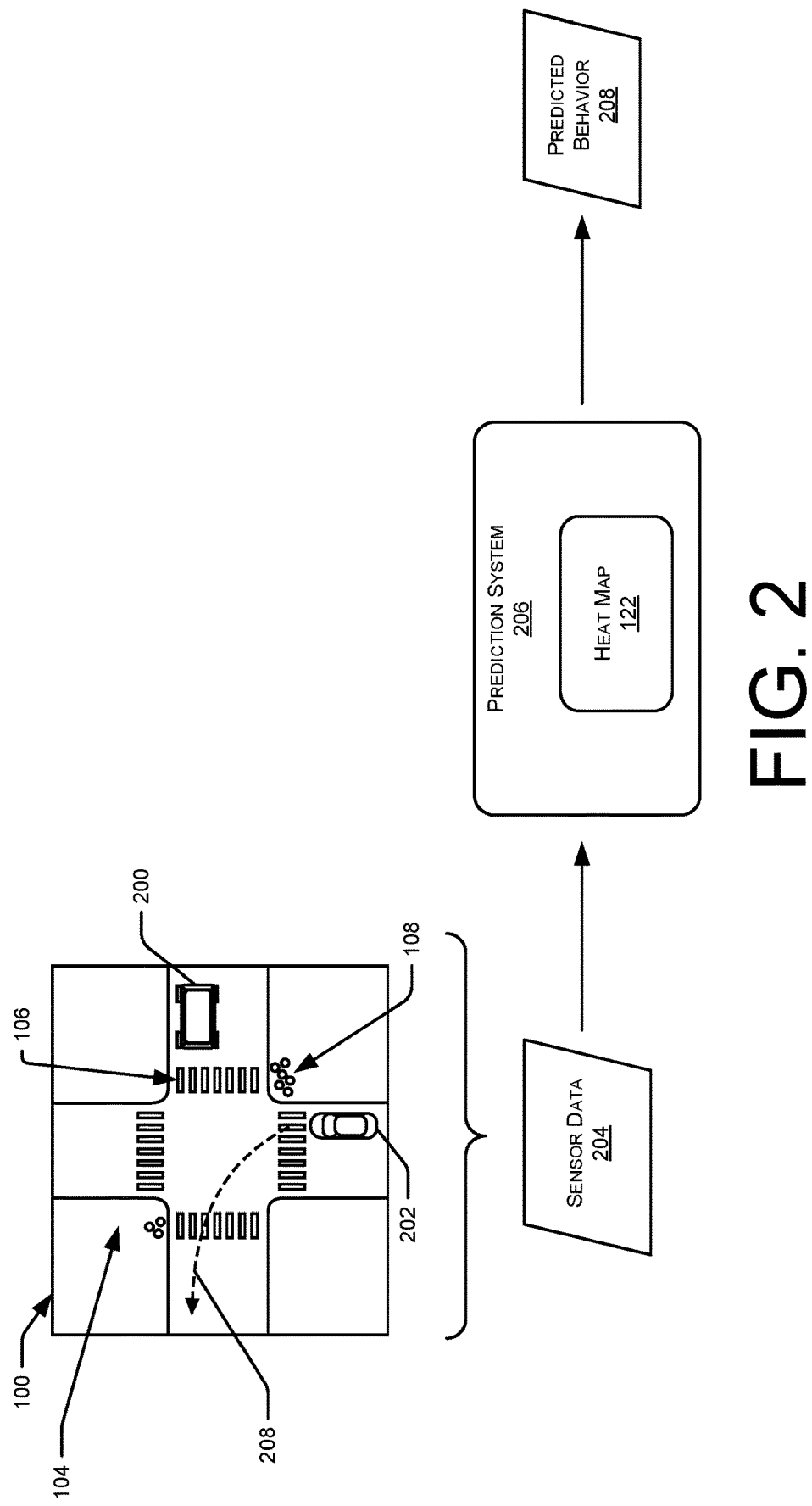
FIG. 2 is a schematic diagram illustrating an example process for predicting a behavior of an entity based on a heat map as described herein.

FIG. 2 is a schematic diagram illustrating an example process for predicting a behavior of an entity based on a heat map as described herein. FIG. 2 depicts the same environment 100 from FIG. 1, at a later time. In FIG. 2, the environment 100 includes a first vehicle 200 and a second vehicle 202. In some examples, the first vehicle 200 can be the same vehicle as vehicle 102 and/or a different vehicle. As described above, the environment 100 can correspond to a particular location (or multiple particular locations) in a larger (global) environment. For illustrative purposes, the environment 100 is associated with a roadway intersection 104. The roadway intersection 104 includes crosswalks 106 to enable pedestrians 108 and/or cyclists (not illustrated in FIG. 2) to cross respective portions of the roadway intersection 104.

For the purpose of illustration, the vehicle 200 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In that case, since the vehicle 200 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled.

The example vehicle 200 shown in FIG. 2 is an automobile having four wheels. Other types and configurations of vehicles are contemplated, such as, for example, vans, sport utility vehicles, cross-over vehicles, trucks, buses, agricultural vehicles, and construction vehicles. The vehicle 200 can be powered by one or more internal combustion engines, one or more electric motors, hydrogen power, any combination thereof, and/or any other suitable power sources. In at least one example, the vehicle 200 can be associated with one or more sensors which can be used to generate sensor data 204. The one or more sensors can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), etc. Additional details associated with the vehicle 200 are described below.

In at least one example, a prediction system 206 associated with the vehicle 200 can receive sensor data 204 directly from the one or more sensors and/or from one of the other systems (e.g., a localization system, a perception system, etc.) associated with the vehicle 200. In some examples, if the prediction system 206 receives sensor data 204 from the one or more sensors, the sensor data 204 can be raw sensor data. In additional and/or alternative examples, if the prediction system 206 receives sensor data 204 from one of the other systems, the sensor data 204 can be processed sensor data.

In at least one example, the perception system associated with the vehicle 200 (not illustrated in FIG. 2) can process sensor data 204 to perform entity detection, segmentation, and/or classification. In some examples, the perception system can provide processed sensor data 204 that indicates a presence of an entity that is proximate to the vehicle 302 and/or a classification of an entity type associated with the entity to the prediction system 206. For instance, as illustrated in FIG. 2, the perception system can detect the second vehicle 202 and classify the second vehicle 202 as a vehicle. Additionally and/or alternatively, the perception system can provide processed sensor data 204 that indicates one or more characteristics associated with a detected entity (e.g., second vehicle 202) and/or the environment 100 to the perception system 206. As described above, characteristics associated with an entity, such as the second vehicle 202, can include, but are not limited to, an x-position (global position), a y-position (global position), a z-position (global position), an orientation, an entity type (e.g., a classification), a velocity of the entity, etc. Characteristics associated with the environment, such as environment 100, can include, but are not limited to, a presence of another entity in the environment, a state of another entity in the environment, a time of day, a day of a week, a season, a weather condition, an indication of darkness/light, etc.

Based at least in part on determining the entity type associated with the second vehicle 202, the prediction system 206 can access the heat map 122 from a database which can be stored on the vehicle 200 or be accessible to the vehicle 200. In at least one example, the prediction system 206 can perform a look-up using the heat map 122 to determine a pattern of behavior associated with the detected entity type (e.g., vehicle). In at least one example, the prediction system 206 can utilize a location of the second vehicle 202 and one or more characteristics associated with the second vehicle 202 and/or the environment 100 to identify a cell in the heat map 122. That is, a cell can be indicative of, or otherwise be referenced by, a unique index comprising the location of the second vehicle 202 and one or more characteristics associated with the second vehicle 202 and/or the environment 100. As described above, the cell can be associated with data indicative of a pattern of behavior of one or more entities (of a same entity type) in the location having the same one or more characteristics of the second vehicle 202 and/or the environment 100. The prediction system 206 can retrieve the data indicative of the pattern of behavior associated with the cell. In at least one example, the prediction system 206 can determine a predicted behavior 208 associated with the second vehicle 202 based at least in part on the pattern of behavior. In at least one example, the predicted behavior 208 can be associated with a distribution of the data stored in the cell and/or can be associated with data derived from the data stored in the cell (e.g., noise, a set, etc.). For instance, in at least one non-limiting example, the predicted behavior 208 can include a plurality of semantic actions that the second vehicle 202 is likely to perform and weights associated with each semantic action of the plurality of semantic actions. Based at least in part on determining a predicted behavior 208 of the second vehicle 202, the prediction system 206 can provide an indication of the predicted behavior to other systems of the vehicle 200. In at least one example, a planning system associated with the vehicle 200 can utilize the predicted behavior for determining a trajectory along which the vehicle 200 can travel. In at least one example, the planning system can send the trajectory to system controller(s) associated with the vehicle 200, which can execute the trajectory to cause the vehicle 200 to drive along the trajectory (e.g., in the example of an autonomous vehicle). The predicted behavior 208 can be used to inform various other systems of the vehicle 200.

Figure 3:
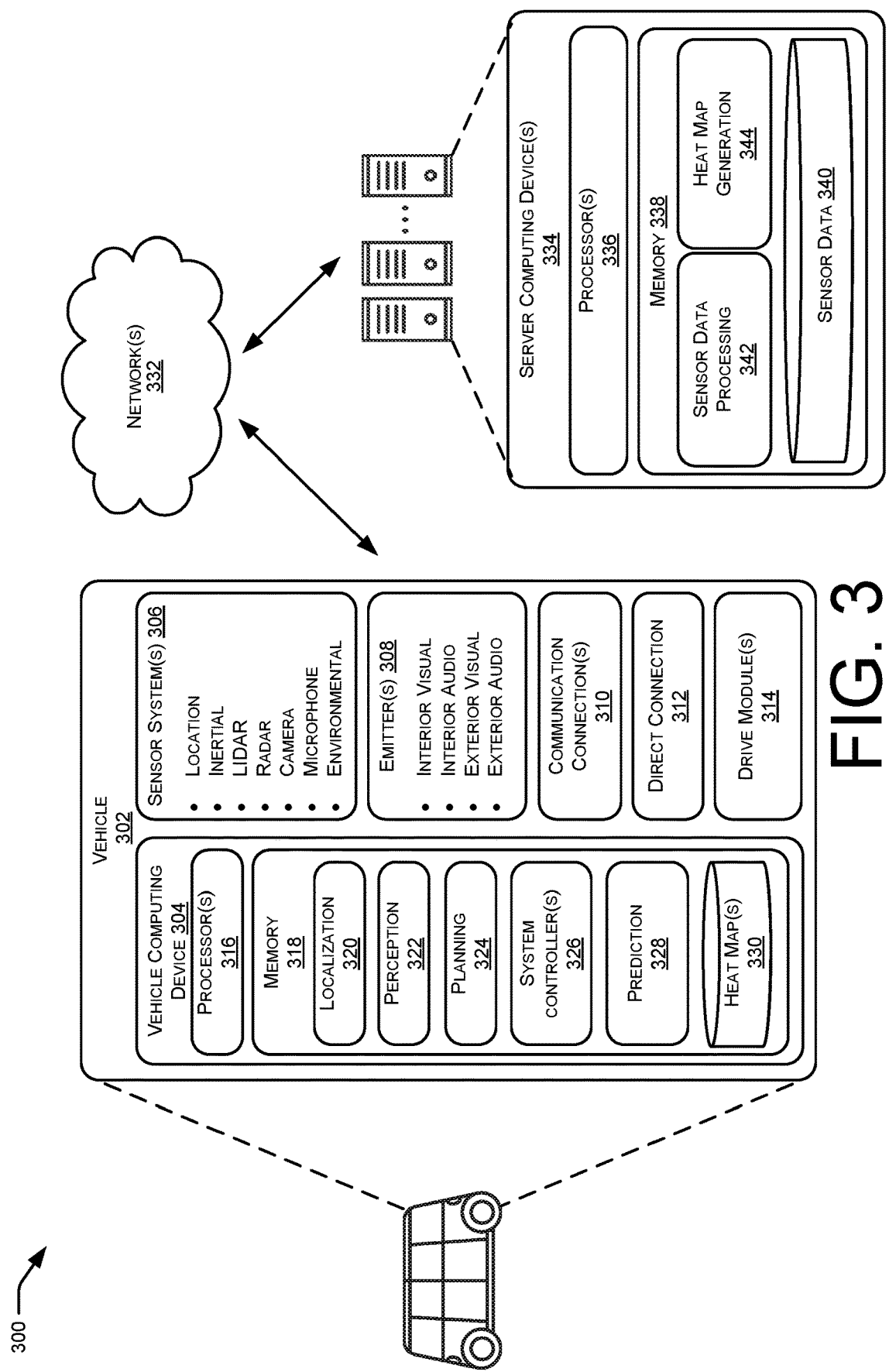
FIG. 3 is a block diagram illustrating an example system for generating heat map(s) and/or predicting behavior(s) based on heat map(s) as described herein.

FIG. 3 is a block diagram illustrating an example system 300 for generating heat map(s) and/or predicting behavior(s) based on heat map(s) as described herein. In at least one example, the system 300 can include a vehicle 302, which can be the same vehicle as the vehicle 102 described above with reference to FIG. 1, or vehicle 200 described above with reference to FIG. 2.

The vehicle 302 can include a vehicle computing device 304, one or more sensor systems 306, one or more emitters 308, one or more communication connections 310, at least one direct connection 312, and one or more drive modules 314.

The vehicle computing device 304 can include one or more processors 316 and memory 318 communicatively coupled with the one or more processors 316. In the illustrated example, the vehicle 302 is an autonomous vehicle; however, the vehicle 302 could be any other type of vehicle. In the illustrated example, the memory 318 of the vehicle computing device 304 stores a localization system 320, a perception system 322, a planning system 324, one or more system controllers 326, a prediction system 328, and one or more heat maps 330. Though depicted in FIG. 3 as residing in memory 318 for illustrative purposes, it is contemplated that such heat map(s) 330 may additionally, or alternatively, be accessible to the vehicle 302 (e.g., stored remotely).

In at least one example, the localization system 320 can determine where the vehicle 302 is in relation to a local and/or global map based at least in part on sensor data received from the sensor system(s) 306, a perception system 322 to perform entity detection, segmentation, and/or classification based at least in part on sensor data received from the sensor system(s) 306, and a planning system 324 to determine routes and/or trajectories to use to control the vehicle 302 based at least in part on sensor data received from the sensor system(s) 306. Additional details of localizer systems, perception systems, and planning systems that are usable can be found in U.S. patent application Ser. No. 14/932,963, filed Nov. 4, 2015, entitled "Adaptive Mapping to Navigate Autonomous Vehicle Responsive to Physical Environment Changes," and Ser. No. 15/632,208, filed Jun. 23, 2017, entitled "Trajectory Generation and Execution Architecture," both of which are incorporated herein by reference. In an example where the vehicle 302 is not an autonomous vehicle, such components can be omitted from the vehicle 302.

In at least one example, the localization system 320, perception system 322, and/or the planning system 324 can process sensor data, as described above, and can send their respective outputs, over one or more network(s) 332, to one or more server computing device(s) 334. In at least one example, the localization system 320, perception system 322, and/or the planning system 324 can send their respective outputs to the one or more server computing device(s) 334 at a particular frequency, after a lapse of a predetermined period of time, in near real-time, etc.

In at least one example, the vehicle computing device 304 can include one or more system controllers 326, which can be configured to control steering, propulsion, braking, safety, emitters, communication, and other systems of the vehicle 302. These system controller(s) 326 can communicate with and/or control corresponding systems of the drive module(s) 314 and/or other components of the vehicle 302.

As described above, the memory 318 can include a prediction system 328, which can correspond to the prediction system 206 described above with reference to FIG. 2. In at least one example, the prediction system 328 can receive sensor data directly from the sensor system(s) 306 and/or from one of the other systems (e.g., the localization system 320, the perception system 322, etc.). In some examples, if the prediction system 328 receives sensor data from the sensor system(s) 306, the sensor data can be raw sensor data. In additional and/or alternative examples, if the prediction system 328 receives sensor data from one of the other systems, the sensor data can be processed sensor data. For instance, in an example, the localization system 320 can process the sensor data to determine where the vehicle 302 is in relation to a local and/or global map and can output processed sensor data (e.g., location data) indicating such information. Additionally and/or alternatively, the perception system 322 can process the sensor data to perform entity detection, segmentation, and/or classification. In some examples, the perception system 322 can provide processed sensor data that indicates a presence of an entity that is proximate to the vehicle 302 and/or a classification of the entity as an entity type (e.g., car, pedestrian, cyclist, unknown, etc.). In additional and/or alternative examples, the perception system 322 can provide processed sensor data that indicates one or more characteristics associated with a detected entity and/or the environment in which the entity is positioned. As described above, characteristics associated with an entity can include, but are not limited to, an x-position (global position), a y-position (global position), a z-position (global position), an orientation, an entity type (e.g., a classification), a velocity of the entity, etc. Characteristics associated with the environment can include, but are not limited to, a presence of another entity in the environment, a state of another entity in the environment, a time of day, a day of a week, a season, a weather condition, an indication of darkness/light, etc.

In at least one example, the prediction system 328 can access a heat map from a heat map database 330, described below, and can perform a look-up using the heat map. In at least one example, the heat map can be associated with an entity type (e.g., a vehicle, a pedestrian, a cyclist, unknown, etc.). In at least one example, the prediction system 328 can perform a look-up to determine a pattern of behavior associated with the detected entity type. In at least one example, the prediction system 328 can utilize a location of an entity and one or more characteristics to identify a cell in a heat map. That is, a cell can be indicative of, or otherwise be referenced by, a unique index comprising the location of the entity and one or more characteristics associated with the entity and/or the environment in which the entity is positioned. As described above, the cell can be associated with data indicative of a pattern of behavior of one or more entities (of a same entity type) in the location having the same one or more characteristics of the entity and/or the environment. The prediction system 328 can retrieve the data indicative of the pattern of behavior associated with the cell and can utilize the data indicative of the pattern of behavior to determine a predicted behavior of the entity.

As a non-limiting example, a detected entity at 1 pm may have a location of 26.37° N, 80.087° W, with a corresponding entity type identified as "vehicle." In such an example, the prediction system 328 can access a heat map associated with a "vehicle" entity type. The prediction system 328 can index a cell of the heat map associated with coordinates 26.37° N, 80.087° W and time of day "afternoon" to determine a pattern of behavior associated with the cell. In an example, data indicative of the pattern of behavior can include "continue forward with constant velocity, 90% confidence," indicating that vehicles in the detected location in the afternoon generally continue driving forward with a constant velocity. That is, by indexing the heat map, the prediction system 328 can receive a result of "continue forward with constant velocity, 90% confidence," and can leverage such information to determine the predicted behavior of the detected entity.

In at least one example, the data can be associated with information such as a co-variance matrix, a confidence value, a data sample size, etc. In such examples, the prediction system 328 can compare the data and associated information with various threshold values to determine the reliability of the data associated with the cell. So long as the data indicative of the pattern of behavior is determined to be reliable, the prediction system 328 can determine to use the pattern of behavior to inform various systems of the vehicle 302. That is, in some examples, based on determining that the data indicative of the pattern of behavior is determined to be reliable, the prediction system 328 can determine a predicted behavior based on the pattern of behavior.

The prediction system 328 can determine whether the data indicative of the pattern of behavior is reliable in various way. For instance, in at least one example, if the data is associated with a co-variance matrix indicating the variation of previous entity behaviors, the prediction system 328 can compare information associated with the co-variance matrix with a threshold. Based at least in part on determining that the information associated with the co-variance matrix satisfies the threshold, the prediction system 328 can determine that the data indicative of the pattern of behavior is reliable. Additionally and/or alternatively, if the data is associated with a confidence value indicating a likelihood that the entity will behave as indicated, the prediction system 328 can compare the confidence value with a threshold confidence value. Based at least in part on determining that the confidence value meets or exceeds the threshold confidence value, the prediction system 328 can determine that the data indicative of the pattern of behavior is reliable. Furthermore, if the data is based on a data sample having a particular number of observations, as described above, the prediction system 328 can compare the number of observations with a threshold number of observations. Based at least in part on determining that the number of observations meets or exceeds the threshold number of observations, the prediction system 328 can determine that the data indicative of the pattern of behavior is reliable and can determine a predicted behavior of an entity based on the pattern of behavior.

In the non-limiting example provided above, data indicative of the pattern of behavior that is associated with the indexed cell includes "continue forward with constant velocity, 90% confidence," indicating that vehicles in the detected location in the afternoon generally continue driving forward with a constant velocity. In such an example, the prediction system 328 can compare the 90% confidence value with a predetermined threshold confidence value to determine whether the data is reliable. If the threshold confidence value is 85%, for instance, the prediction system 328 can determine that the data is reliable. That is, the prediction system 328 can determine that "continue forward with constant velocity" is reliable and can leverage such information to determine the predicted behavior of the detected entity.

As described above, in at least one example, the predicted behavior can be associated with a distribution of the data indicative of the pattern of behavior stored in the cell and/or can be associated with data derived from the data indicative of the pattern of behavior stored in the cell (e.g., noise, a set, etc.). For instance, in at least one non-limiting example, the predicted behavior 208 can include a plurality of intended destinations that the second vehicle 202 is likely to perform (per the data indicative of the pattern of behavior) and weights associated with each intended destination of the plurality of intended destinations.

Based at least in part on determining a predicted behavior of an entity, the prediction system 328 can provide an indication of the predicted behavior to other systems of the vehicle computing device 304. As described above, in at least one example, the predicted behavior can be used to inform the perception system 322 for performing entity detection, segmentation, and/or classification (e.g., in an example, a heat map can be used for performing an inverse look-up to determine an entity type). Additionally and/or alternatively, the planning system 324 can utilize the predicted behavior for determining a trajectory along which the vehicle 302 can travel. The planning system 324 can send the trajectory to the system controller(s) 326, which can execute the trajectory to cause the vehicle 302 to drive along the trajectory (e.g., in the example of an autonomous vehicle). Additionally and/or alternatively, the predicted behavior can be used for weighting trajectories generated by the planning system 324 that can determine routes and/or trajectories to use to control the vehicle 302. Furthermore, the predicted behavior can be used to inform a neural network that can be used to predict behavior(s) of entity(s). In additional and/or alternative examples, the pattern of behavior associated with the cell of the heat map 330 can be used as a decent prior.

In at least one example, the vehicle computing device 304 can have access to one or more heat maps 330. In some examples, as shown in FIG. 3, the memory 318 can include a database storing one or more heat maps 330. In some examples, the one or more heat maps 330 may be stored on a remote computing device(s) (such as remote computing device(s) 334) accessible via network(s) 332. In some examples, multiple heat maps 330 may be stored based on, for example, a characteristic (e.g., type of entity, time of day, day of week, etc.). Storing multiple heat maps 330 may have similar memory requirements, but increase the speed at which data in a heat map may be accessed.

As described above, a heat map is a multi-dimensional data structure. In some examples, each dimension of a heat map can be associated with a particular characteristic. As described above, in at least one example, a heat map can be associated with a plurality of cells. A cell of the plurality of cells can be indicative of, or otherwise be referenced by, a unique index associated with one or more characteristics associated with the entity and/or the environment in which the entity is positioned. For instance, in at least one example, a cell can be indicative of, or otherwise be referenced by, a unique index associated with a location of an entity and one or more other characteristics associated with the entity and/or the environment in which the entity is positioned. As described above, data indicative of a pattern of behavior of entities associated with an entity type can be associated with a cell. In at least one example, the data indicative of a pattern of behavior can be based on behaviors of one or more entities (of a same entity type) that are associated with the same location and same characteristic(s).

In at least one example, the sensor system(s) 306 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 306 can include multiple instances of each of these or other types of sensors. For instance, the LIDAR sensors can include individual LIDAR sensors located at the corners, front, back, sides, and/or top of the vehicle 302. As another example, the camera sensors can include multiple cameras disposed at various locations about the exterior and/or interior of the vehicle 302. The sensor system(s) 306 can provide input to the vehicle computing device 304. Additionally and/or alternatively, the sensor system(s) 306 can send sensor data, via the one or more networks 332, to the one or more server computing device(s) 334 at a particular frequency, after a lapse of a predetermined period of time, in near real-time, etc.

The vehicle 302 can also include one or more emitters 308 for emitting light and/or sound, as described above. The emitters 308 in this example include interior audio and visual emitters to communicate with passengers of the vehicle 302. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles.

The vehicle 302 can also include one or more communication connection(s) 310 that enable communication between the vehicle 302 and one or more other local or remote computing device(s). For instance, the communication connection(s) 310 can facilitate communication with other local computing device(s) on the vehicle 302 and/or the drive module(s) 314. Also, the communication connection(s) 310 can allow the vehicle to communicate with other nearby computing device(s) (e.g., other nearby vehicles, traffic signals, etc.). The communications connection(s) 310 also enable the vehicle 302 to communicate with a remote teleoperations computing device or other remote services.

The communications connection(s) 310 can include physical and/or logical interfaces for connecting the vehicle computing device 304 to another computing device or a network, such as network(s) 332. For example, the communications connection(s) 310 can enable Wi-Fi-based communication such as via frequencies defined by the IEEE 802.11 standards, short range wireless frequencies such as Bluetooth®, or any suitable wired or wireless communications protocol that enables the respective computing device to interface with the other computing device(s).

In at least one example, the vehicle 302 can include one or more drive modules 314. In some examples, the vehicle 302 can have a single drive module 314. In at least one example, if the vehicle 302 has multiple drive modules 314, individual drive modules 314 can be positioned on opposite ends of the vehicle 302 (e.g., the front and the rear, etc.). In at least one example, the drive module(s) 314 can include one or more sensor systems to detect conditions of the drive module(s) 314 and/or the surroundings of the vehicle 302. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders can be unique to the drive module(s) 314. In some cases, the sensor system(s) on the drive module(s) 314 can overlap or supplement corresponding systems of the vehicle 302 (e.g., sensor system(s) 306).

The drive module(s) 314 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 314. Furthermore, the drive module(s) 314 also include one or more communication connection(s) that enable communication by the respective drive module with one or more other local or remote computing device(s).

As described above with reference to FIGS. 1 and 2, the vehicle 302 can send sensor data to one or more server computing device(s) 334, via the network(s) 332. In some examples, the vehicle 302 can send raw sensor data to the server computing device(s) 334. In other examples, the vehicle 302 can send processed sensor data and/or representations of sensor data to the server computing device(s) 334. In some examples, the vehicle 302 can send sensor data to the server computing device(s) 334 at a particular frequency, after a lapse of a predetermined period of time, in near real-time, etc.

The server computing device(s) 334 can receive the sensor data (raw or processed) and can generate and/or update heat maps based on the sensor data. In at least one example, the server computing device(s) 334 can include one or more processors 336 and memory 338 communicatively coupled with the one or more processors 336. In the illustrated example, the memory 338 of the server computing device(s) 334 stores a sensor data database 340, a sensor data processing system 342, and a heat map generation system 344. In at least one example, the heat map generation system 344 can correspond to the heat map generation system 118, described above with reference to FIG. 1.

The sensor data database 340 can store sensor data (raw or processed) received from one or more vehicles, such as vehicle 302. The sensor data in the sensor data database 340 can represent sensor data collected by one or more onboard sensor systems (e.g., such as onboard sensor system(s) 306), or other sensor system(s), at previous time(s) (e.g., previously connected sensor data). In some examples, the sensor data can be stored in association with locations, entity types, and/or other types of characteristics. Additionally, in at least one example, behaviors determined from the sensor data can be stored in the sensor data database 340. That is, the behaviors of individual entities can be associated with particular sensor data from which the behaviors were determined.

In at least one example, the sensor data processing system 342 can receive sensor data (raw or processed) from one or more vehicles, such as the vehicle 302. As described above, the vehicle 302 can send sensor data to the server computing device(s) 334 at a particular frequency, after a lapse of a predetermined period of time, in near real-time, etc. Accordingly, the sensor data processing system 342 can receive the sensor data at a particular frequency, after a lapse of a predetermined period of time, in near real-time, etc. In additional and/or alternative examples, the sensor data processing system 342 can receive data from additional and/or alternative sensor system(s) (e.g., that are not associated with a vehicle). In some examples, the sensor data processing system 342 can send the sensor data to the sensor data database 340 for storage.

In at least one example, the sensor data processing system 342 can process the sensor data. In some examples, the sensor data processing system 342 can determine a behavior of an entity associated with a particular entity type based on the sensor data. That is, the sensor data processing system 342 can analyze sensor data associated with a particular period of time to determine how entity(s) in an environment behave during the period of time. In at least one example, the sensor data database 340 can store data indicative of a behavior of an entity that is associated with an entity type, which can be associated in the sensor data database 340 with sensor data utilized to determine the behavior. In at least one example, data indicative of a behavior of an entity associated with an entity type, as determined from sensor data, can be associated with an observation. Such observations can be stored in the sensor data database 340.

The heat map generation system 344 can be configured to generate heat maps. In at least one example, a heat map generation system 344 can access observations from the sensor data database 342. In some examples, the heat map generation system 344 can aggregate observations associated with one or more characteristics and can perform a statistical analysis on the aggregated data to identify patterns of behavior exhibited by individual entities associated with the one or more characteristics. In at least one example, at least one of the one or more characteristics can be an entity type. Additionally and/or alternatively, in at least one example, at least one of the one or more characteristics can be an x-position and another of the characteristics can be a y-position of an entity. That is, the patterns of behavior can be associated with entities having a same entity type in a location (associated with the x-position and y-position). In some examples, additional and/or alternative of the one or more other characteristics can be used to aggregate data for performing the statistical analysis.

In at least one example, the heat map generation system 344 can analyze the observations such to generate a probability distribution from which patterns of behavior can be determined. For instance, in at least one example, the heat map generation system 344 can analyze the probability distribution to determine an average, a median, a maximum, a minimum, or other statistically significant value to determine a pattern of behavior that is representative of an entity type, that is associated with the same one or more characteristics, in the location. In at least one example, the pattern of behavior can indicate a pose (e.g., location, orientation, etc.) of entities having an entity type (e.g., a vehicle, a pedestrian, a cyclist, etc.) at a predetermined future time (e.g., two seconds, five seconds, etc.), an intended destination of entities having the entity type, a position, velocity, and/or acceleration of an entities having the entity type at a predetermined future time, a semantic action (e.g., continue straight, follow sidewalk, hold still, etc.), etc.

The heat map generation system 344 can generate a heat map based at least in part on determined patterns of behavior of entity types. In at least one example, the heat map generation system 344 can determine a cell in a heat map associated with two or more characteristics associated with the entity and/or the environment. In an example, the heat map can be associated with an entity type and the cell can be associated with a location of an entity (e.g., the x-position and the y-position) and one or more other characteristics. Based at least in part on identifying a cell, the heat map generation system 344 can associate data representative of the determined pattern of behavior for the entity type with the cell. As described above, the pattern of behavior can be representative of behaviors of one or more entities (of a same entity type) that are associated with the same one or more characteristics and are in a same location. In some examples, the data representative of the determined pattern of behavior can be associated with information, such as a confidence value, a co-variance matrix, a data sample size (e.g., number of observations used to generate the probability distribution), etc.

In at least one example, each of the cells in a heat map can correspond to a particular location in an environment. In such an example, each cell can be associated with different location data. In at least one example, each cell can include data indicative of a pattern of behavior of entity(s) (having a same entity type) in a particular location. In some examples, a cell can correspond to a particular GPS location. In other examples, a cell can correspond to one or more GPS locations associated with a same range and/or same semantic feature of a map. In some examples, a cell can be empty—that is, no data may be stored in a particular cell—if one or more observations have not been collected for such a particular location and/or the one or more observations that are available are inadequate. The observations may be inadequate if information associated with the co-variance matrix does not satisfy a threshold, the data sample size does not meet a threshold size, etc. In such examples, various storage algorithms (e.g. kd-trees, octrees, etc.) may be employed to minimize the memory size requirements for storing the heat map.

The processor(s) 316 of the vehicle 302 and the processor(s) 336 of the server computing device(s) 334 can be any suitable processor capable of executing instructions to process data and perform operations as described herein. By way of example and not limitation, the processor(s) 316 and 336 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 318 and memory 338 are examples of non-transitory computer-readable media. Memory 318 and memory 338 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 3 is illustrated as a distributed system, in alternative examples, components of the vehicle 302 can be associated with the server computing device(s) 334 and/or components of the server computing device(s) 334 can be associated with the vehicle 302. That is, the vehicle 302 can perform one or more of the functions associated with the server computing device(s) 334, and vice versa.

FIGS. 4-7 are flowcharts showing example methods involving using probabilistic heat maps for predicting entity behavior. The methods illustrated in FIGS. 4-7 are described with reference to the vehicle 302 shown in FIG. 3 for convenience and ease of understanding. However, the methods illustrated in FIGS. 4-7 are not limited to being performed using vehicle 302 shown in FIG. 3, and can be implemented using any of the other vehicles described in this application, as well as vehicles other than those described herein. Moreover, the vehicle 302 described herein is not limited to performing the methods illustrated in FIGS. 4-7.

The methods 400-700 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 400-700 can be combined in whole or in part with each other or with other methods.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Figure 4:
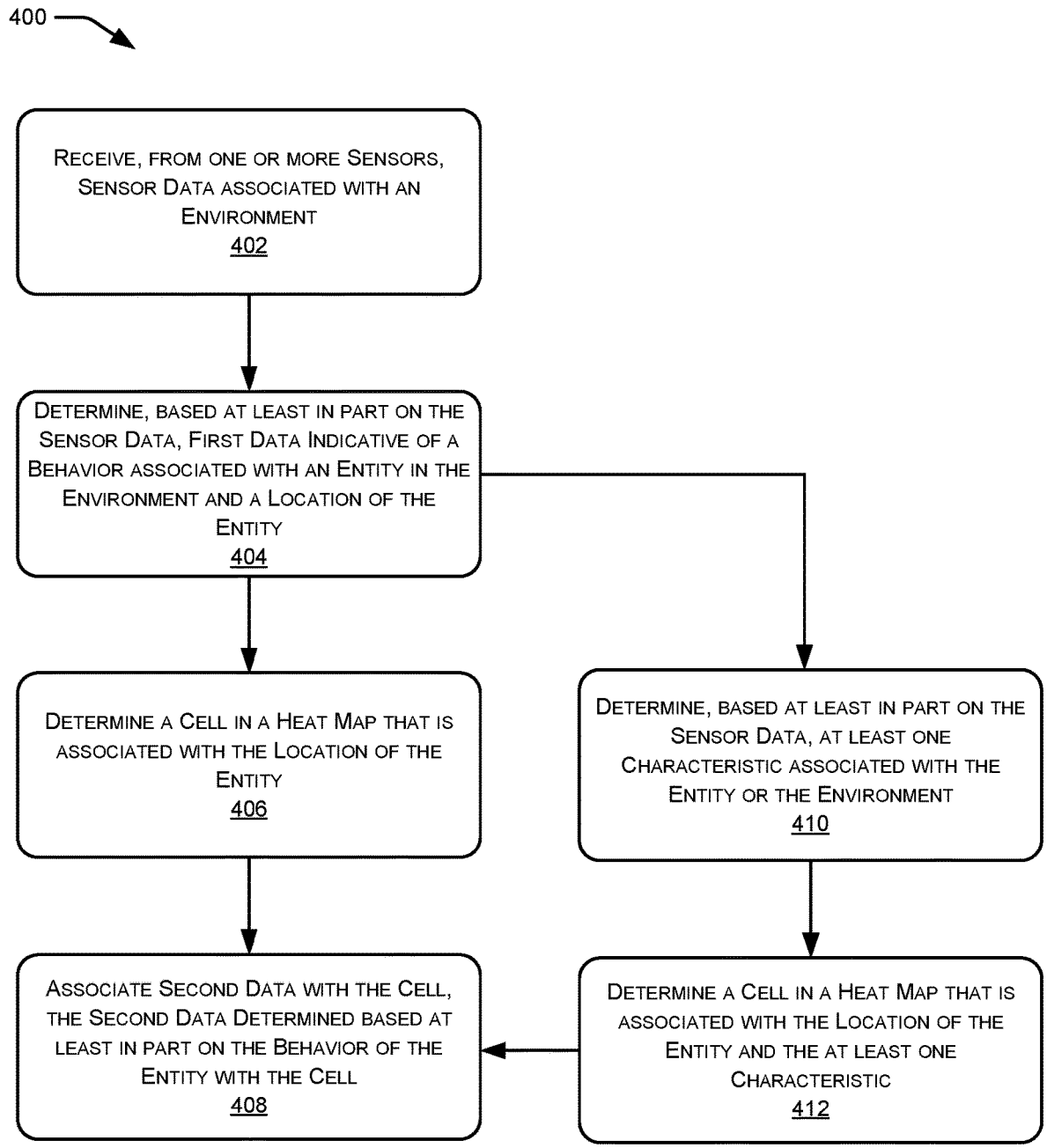
FIG. 4 is a flowchart illustrating an example method for generating a heat map as described herein.

FIG. 4 is a flowchart illustrating an example method 400 for generating a heat map as described herein.

Block 402 illustrates receiving, from one or more sensors, sensor data associated with an environment. In at least one example, the sensor data processing system 342 can receive sensor data (raw or processed) from one or more vehicles, such as the vehicle 302. As described above, the vehicle 302 can send sensor data to the server computing device(s) 334 at a particular frequency, after a lapse of a predetermined period of time, in near real-time, etc. Accordingly, the sensor data processing system 342 can receive the sensor data at a particular frequency, after a lapse of a predetermined period of time, in near real-time, etc. In additional and/or alternative examples, the sensor data processing system 342 can receive data from additional and/or alternative sensor system(s) (e.g., that are not associated with a vehicle). In some examples, the sensor data processing system 342 can send the sensor data to the sensor data database 340 for storage.

Block 404 illustrates determining, based at least in part on the sensor data, first data indicative of a behavior associated with an entity in the environment and a location of the entity. In at least one example, the sensor data processing system 342 can process the sensor data. In some examples, the sensor data processing system 342 can determine a behavior of an entity associated with a particular entity type based on the sensor data. That is, the sensor data processing system 342 can analyze sensor data associated with a particular period of time to determine how entity(s) in an environment behave during the period of time. In at least one example, the sensor data database 340 can store data indicative of a behavior of an entity that is associated with an entity type, which can be associated in the sensor data database 340 with sensor data utilized to determine the behavior. In at least one example, data indicative of a behavior of an entity associated with an entity type, as determined from sensor data, can be associated with an observation. Such observations can be stored in the sensor data database 340.

Additionally and/or alternatively, the sensor data processing system 342 can process the sensor data to determine a location of the entity (e.g., an x-position (global position), a y-position (global position), a z-position (global position), a semantic location based on a map). In some examples, the sensor data processing system 324 can access previously processed sensor data indicative of such information (e.g., location) that is stored in the sensor data database 340 and/or can receive processed sensor data (e.g., from the vehicle 300) that is indicative of such information.

Block 406 illustrates determining a cell in a heat map that is associated with the location of the entity. In at least one example, the heat map generation system 344 can determine a cell in a heat map associated with two or more characteristics associated with the entity and/or the environment. In an example, the heat map can be associated with an entity type and the cell can be associated with a location of an entity (e.g., the x-position and the y-position). For instance, a cell can be indicative of, or otherwise be referenced by, a unique index comprising the location (e.g., the x-position and the y-position) of the entity.

Block 408 illustrates associating second data with the cell, the second data determined based at least in part on the behavior of the entity. In at least one example, a heat map generation system 344 can access observations from the sensor data database 342. In some examples, the heat map generation system 344 can aggregate observations associated with one or more characteristics and can perform a statistical analysis on the aggregated data to identify patterns of behavior exhibited by individual entities associated with the one or more characteristics. In at least one example, the second data can be indicative of a pattern of behavior determined for an entity type, associated with one or more characteristics, in a location. Additional details associated with determining the second data are described below with respect to FIG. 5.

In at least one example, such second data can be associated with the cell of the heat map. Based at least in part on identifying a cell, the heat map generation system 344 can associate second data that is representative of the determined pattern of behavior for the entity type with the cell. As described above, the second data can be indicative of a pattern of behavior that is representative of behaviors of one or more entities (of a same entity type) that are associated with the location.

In some examples, the heat map generation system 344 can leverage information in addition to location to determine which cell of a heat map to associate the second data. Block 410 illustrates determining, based at least in part on the sensor data, at least one characteristic associated with the entity or the environment. In at least one example, the sensor data processing system 342 can process the sensor data to determine one or more other characteristics associated with the entity and/or the environment in which such an entity was positioned. In some examples, the sensor data processing system 324 can access previously processed sensor data indicative of such information (e.g., one or more other characteristics) that is stored in the sensor data database 340 and/or can receive processed sensor data (e.g., from the vehicle 300) that is indicative of such information. As described above, characteristics associated with an entity can include, but are not limited to, an orientation, an entity type (e.g., a classification), a velocity of the entity, etc. Characteristics associated with the environment can include, but are not limited to, a presence of another entity in the environment, a state of another entity in the environment, a time of day, a day of a week, a season, a weather condition, an indication of darkness/light, etc.

Block 412 illustrates determining a cell in a heat map that is associated with the location of the entity and the at least one characteristic. As described above, in at least one example, the heat map generation system 344 can determine a cell in a heat map associated with two or more characteristics associated with the entity and/or the environment. In an example, the heat map can be associated with an entity type and the cell can be associated with a location of an entity (e.g., the x-position and the y-position) and one or more other characteristics. Based at least in part on identifying a cell, the heat map generation system 344 can associate second data that is representative of the determined pattern of behavior for the entity type with the cell, as illustrated in block 408. As described above, the second data can be indicative of a pattern of behavior that is representative of behaviors of one or more entities (of a same entity type) that are associated with the same one or more characteristics and are in the location.

Figure 5:
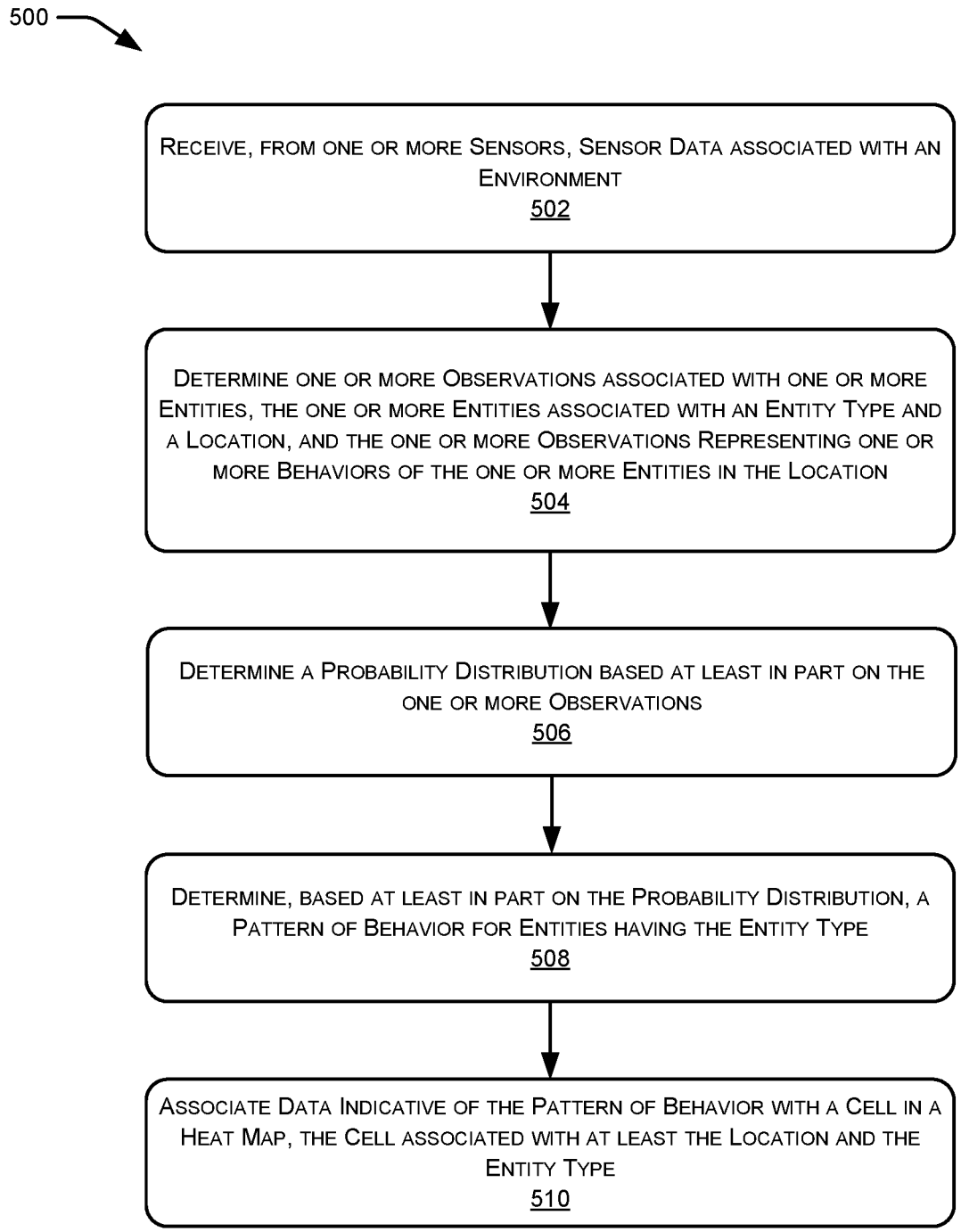
FIG. 5 is a flowchart illustrating an example method for determining a pattern of behavior that can be used for generating a heat map as described herein.

FIG. 5 is a flowchart illustrating an example method 500 for determining a pattern of behavior that can be used for generating a heat map as described herein.

Block 502 illustrates receiving, from one or more sensors, sensor data associated with an environment. In at least one example, the sensor data processing system 342 can receive sensor data (raw or processed) from one or more vehicles, such as the vehicle 302. As described above, the vehicle 302 can send sensor data to the server computing device(s) 334 at a particular frequency, after a lapse of a predetermined period of time, in near real-time, etc. Accordingly, the sensor data processing system 342 can receive the sensor data at a particular frequency, after a lapse of a predetermined period of time, in near real-time, etc. In additional and/or alternative examples, the sensor data processing system 342 can receive data from additional and/or alternative sensor system(s) (e.g., that are not associated with a vehicle). In some examples, the sensor data processing system 342 can send the sensor data to the sensor data database 340 for storage.

Block 504 illustrates determining one or more observations associated with one or more entities, the one or more entities associated with an entity type and a location, and the one or more observations representing one or more behaviors of the one or more entities in the location. In at least one example, the sensor data processing system 342 can process the sensor data. In some examples, the sensor data processing system 342 can determine a behavior of an entity associated with a particular entity type based on the sensor data. That is, the sensor data processing system 342 can analyze sensor data associated with a particular period of time to determine how entity(s) in an environment behave during the period of time. In at least one example, the sensor data database 340 can store data indicative of a behavior of an entity that is associated with an entity type, which can be associated in the sensor data database 340 with sensor data utilized to determine the behavior. In at least one example, data indicative of a behavior of an entity associated with an entity type, as determined from sensor data, can be associated with an observation, as described above. The sensor data processing system 342 can access sensor data from multiple entities and can determine observations associated with each of the entities. Observations associated with multiple entities can be stored in the sensor data database 340.

Block 506 illustrates determining a probability distribution based at least in part on the one or more observations. In at least one example, a heat map generation system 344 can access observations from the sensor data database 342. In some examples, the heat map generation system 344 can aggregate observations associated with one or more characteristics and can perform a statistical analysis on the aggregated data to identify patterns of behavior exhibited by individual entities associated with the one or more characteristics. In at least one example, at least one of the one or more characteristics can be an entity type. Additionally and/or alternatively, in at least one example, at least one of the one or more characteristics can be an x-position and another of the characteristics can be a y-position of an entity. That is, the patterns of behavior can be associated with entities having a same entity type in a location (associated with the x-position and y-position). In some examples, additional and/or alternative of the one or more other characteristics can be used to aggregate data for performing the statistical analysis. In at least one example, the heat map generation system 344 can analyze the observations such to generate a probability distribution from which patterns of behavior can be determined.

Block 508 illustrates determining, based at least in part on the probability distribution, a pattern of behavior for entities having the entity type. In at least one example, the heat map generation system 344 can analyze the probability distribution to determine an average, a median, a maximum, a minimum, or other statistically significant value to determine a pattern of behavior that is representative of an entity type, that is associated with the same one or more characteristics, in the location. In at least one example, the pattern of behavior can indicate a pose (e.g., location, orientation, etc.) of entities having an entity type (e.g., a vehicle, a pedestrian, a cyclist, etc.) at a predetermined future time (e.g., two seconds, five seconds, etc.), an intended destination of entities having the entity type, a position, velocity, and/or acceleration of an entities having the entity type at a predetermined future time, a semantic action (e.g., continue straight, follow sidewalk, hold still, etc.), etc.

Block 512 illustrates associating data indicative of the pattern of behavior with a cell in a heat map, the cell associated with at least the location and the entity type. In at least one example, the heat map generation system 344 can associate data indicative of the pattern of behavior with a cell in a heat map. As described above with reference to FIG. 4, in at least one example, the heat map generation system 344 can determine a cell in a heat map associated with two or more characteristics associated with the entity and/or the environment. In an example, the heat map can be associated with an entity type and the cell can be associated with a location of an entity (e.g., the x-position and the y-position) and, in some examples, one or more other characteristics. Based at least in part on identifying a cell, the heat map generation system 344 can associate data representative of the determined pattern of behavior for the entity type with the cell.

Figure 6:
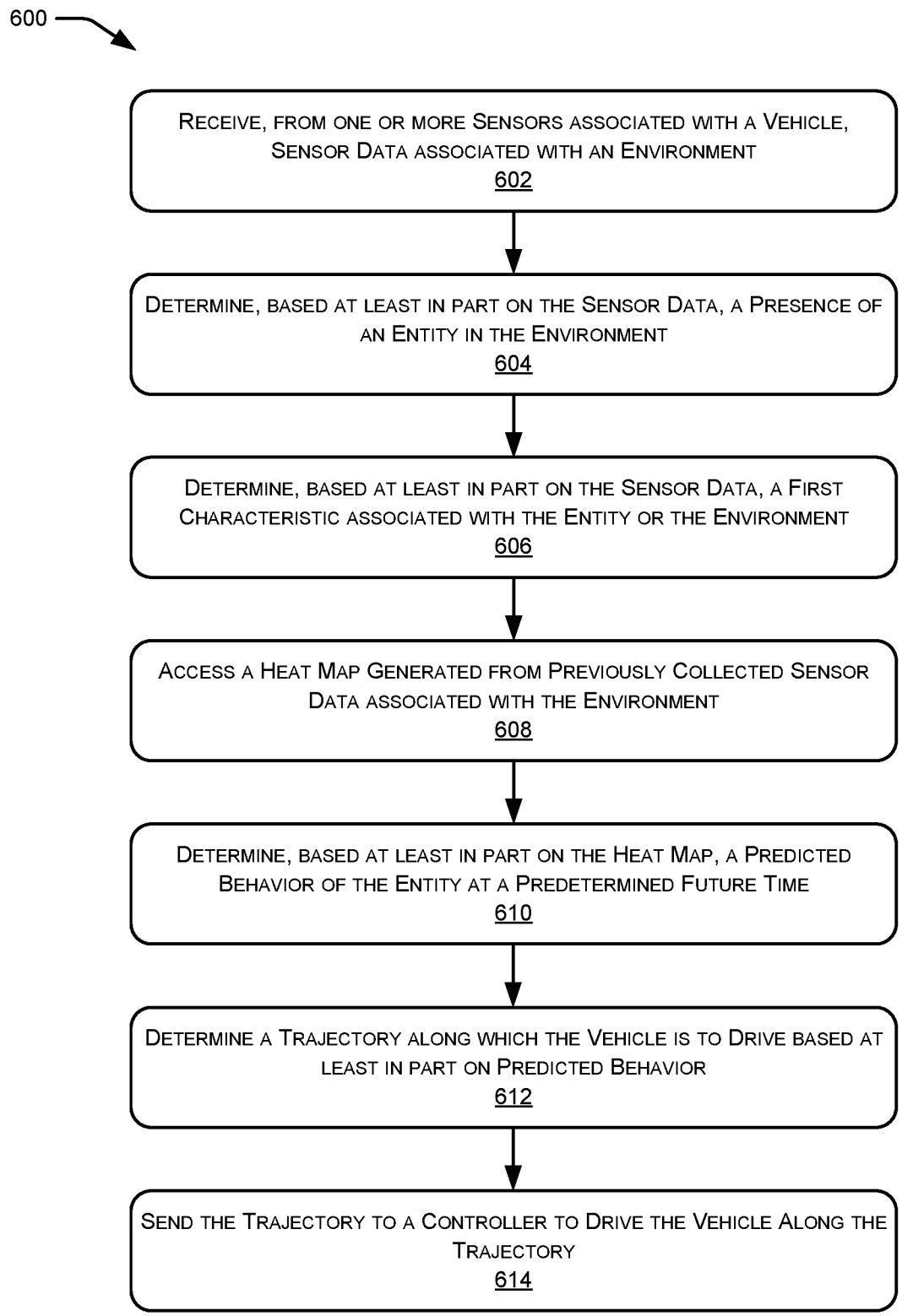
FIG. 6 is a flowchart illustrating an example method for determining a predicted behavior of an entity based on a heat map as described herein.

FIG. 6 is a flowchart illustrating an example method 600 for determining a predicted behavior of an entity based on a heat map as described herein.

Block 602 illustrates receiving, from one or more sensors associated with a vehicle, sensor data associated with an environment. As described above, in at least one example, the prediction system 328 can receive sensor data directly from the sensor system(s) 306 and/or from one of the other systems (e.g., the localization system 320, the perception system 322, etc.). In some examples, if the prediction system 328 receives sensor data from the sensor system(s) 306, the sensor data can be raw sensor data. In additional and/or alternative examples, if the prediction system 328 receives sensor data from one of the other systems, the sensor data can be processed sensor data.

Block 604 illustrates determining, based at least in part on the sensor data, a presence of the entity in the environment. As described above, in at least one example, the perception system 322 can process sensor data to perform entity detection, segmentation, and/or classification. In some examples, the perception system 322 can provide processed sensor data that indicates a presence of an entity that is proximate to the vehicle 302 and/or classify the entity as an entity type (e.g., car, pedestrian, cyclist, unknown, etc.) to the prediction system 328.

Block 606 illustrates determining, based at least in part on the sensor data, a first characteristic associated with the entity or the environment. As described above, the perception system 322 can provide processed sensor data that indicates one or more characteristics associated with a detected entity and/or the environment in which the entity is positioned. As described above, characteristics associated with an entity can include, but are not limited to, an x-position (global position), a y-position (global position), a z-position (global position), an orientation, an entity type (e.g., a classification), a velocity of the entity, etc. Characteristics associated with the environment can include, but are not limited to, a presence of another entity in the environment, a state of another entity in the environment, a time of day, a day of a week, a season, a weather condition, an indication of darkness/light, etc.

Block 608 illustrates access a heat map generated from previously collected sensor data associated with the environment. In at least one example, the prediction system 328 can access a heat map from a database (e.g., heat map database 330, or otherwise), described below, and can perform a look-up using the heat map. In at least one example, the heat map can be associated with an entity type (e.g., a vehicle, a pedestrian, a cyclist, unknown, etc.) and/or another characteristic.

Block 610 illustrates determining, based at least in part on the heat map, a predicted behavior of the entity at a predetermined future time. In at least one example, the prediction system 328 can perform a look-up to determine a pattern of behavior associated with the detected entity type. In at least one example, the prediction system 328 can utilize a location of an entity and one or more characteristics to identify a cell in a heat map. That is, a cell can be indicative of, or otherwise be referenced by, a unique index comprising the location of the entity and one or more characteristics associated with the entity and/or the environment in which the entity is positioned. As described above, the cell can be associated with data indicative of a pattern of behavior of one or more entities (of a same entity type) in the location having the same one or more characteristics of the entity and/or the environment. The prediction system 328 can retrieve the data indicative of the pattern of behavior associated with the cell. In at least one example, the prediction system 328 can determine a predicted behavior associated with the entity based at least in part on the pattern of behavior. In some examples, as described below with respect to FIG. 7, the prediction system 328 can determine that the data is reliable prior to determining the predicted behavior.

In at least one example, the predicted behavior can be a single behavior determined from the pattern of behavior (e.g., a pose (e.g., location, orientation, etc.) of entities having an entity type (e.g., a vehicle, a pedestrian, a cyclist, etc.) at a predetermined future time (e.g., two seconds, five seconds, etc.), an intended destination of entities having the entity type, a position, velocity, and/or acceleration of an entities having the entity type at a predetermined future time, a semantic action (e.g., continue straight, follow sidewalk, hold still, etc.), etc.). Or, as described above, in an additional and/or alternative example, the predicted behavior can be associated with a distribution of the data indicative of the pattern of behavior stored in the cell and/or can be associated with data derived from the data indicative of the pattern of behavior stored in the cell (e.g., noise, a set, etc.).

Block 612 illustrates determining a trajectory along which the vehicle is to drive based at least in part on predicted behavior. Based at least in part on determining a predicted behavior of an entity, the prediction system 328 can provide an indication of the predicted behavior to other systems of the vehicle computing device 304. In at least one example, the planning system 324 can utilize the predicted behavior for determining a trajectory along which the vehicle 302 can travel.

Block 614 illustrates sending the trajectory to a controller to drive the vehicle along the trajectory. In at least one example, the planning system 324 can send the trajectory to the system controller(s) 326, which can execute the trajectory to cause the vehicle 302 to drive along the trajectory (e.g., in the example of an autonomous vehicle).

Figure 7:
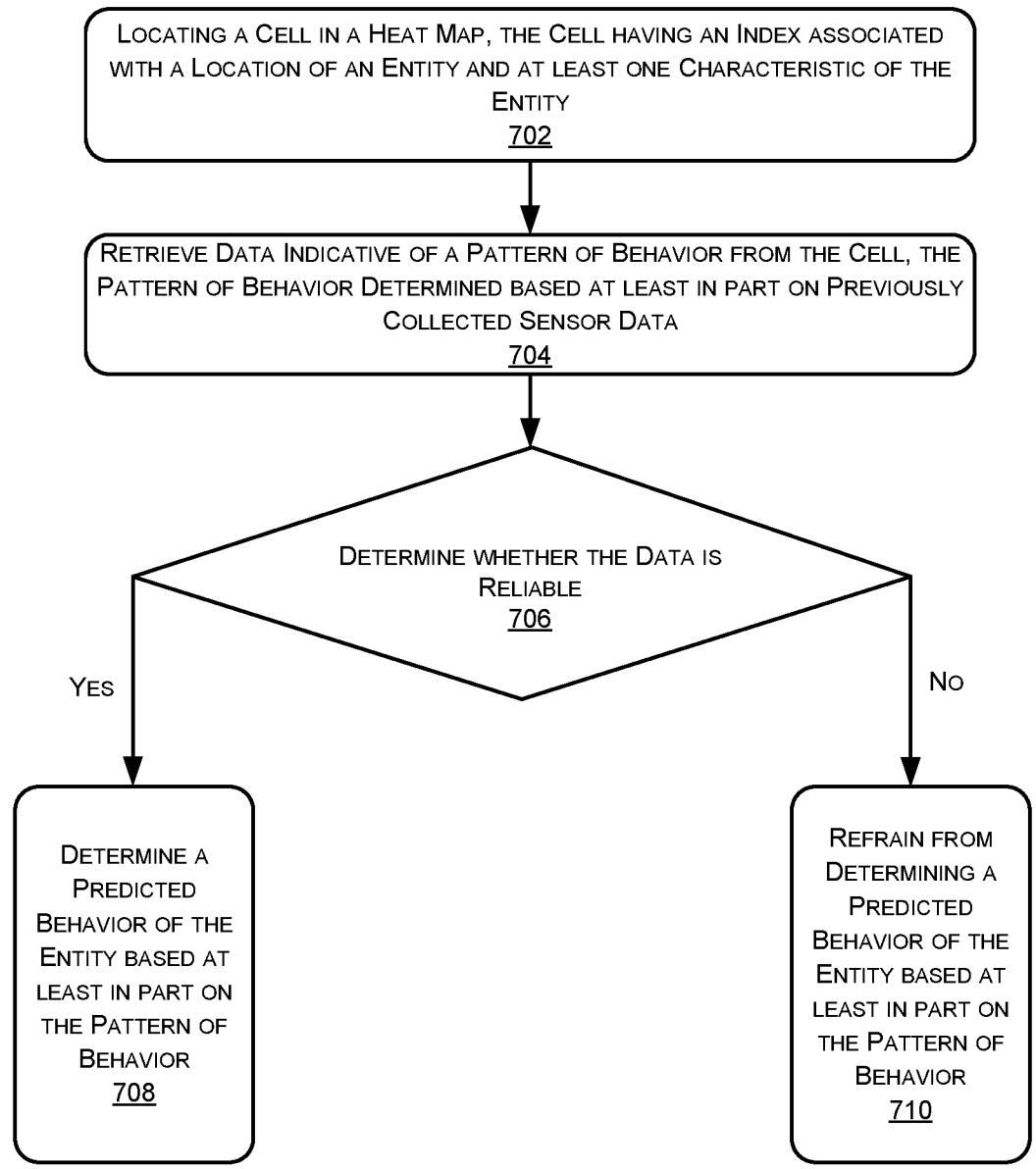
FIG. 7 is a flowchart illustrating an example method for retrieving data from a cell of a heat map and determining whether to use the data to determine a predicted behavior based on the reliability of the data as described herein.

FIG. 7 is a flowchart illustrating an example method 700 for retrieving data from a cell of a heat map and determining whether to use the data to determine a predicted behavior based on the reliability of the data as described herein.

Block 702 illustrates locating a cell in a heat map, the cell having an index associated with a location of an entity and at least one characteristic of the entity. As described above, in at least one example, the prediction system 328 can perform a look-up to determine a pattern of behavior associated with the detected entity type. In at least one example, the prediction system 328 can utilize a location of an entity and one or more characteristics to identify a cell in a heat map. That is, a cell can be indicative of, or otherwise be referenced by, a unique index comprising the location of the entity and one or more characteristics associated with the entity and/or the environment in which the entity is positioned.

Block 704 illustrates retrieving data indicative of a pattern of behavior from the cell, the pattern of behavior determined based at least in part on previously collected sensor data. As described above, the cell can be associated with data indicative of a pattern of behavior of one or more entities (of a same entity type) in the location having the same one or more characteristics of the entity and/or the environment. The prediction system 328 can retrieve the data indicative of the pattern of behavior associated with the cell. In at least one example, the prediction system 328 can determine a predicted behavior associated with the entity based at least in part on the pattern of behavior.

Block 706 illustrates determining whether the data is reliable. In at least one example, the data can be associated with information such as a co-variance matrix, a confidence value, a data sample size, etc. In such examples, the prediction system 328 can compare the data and associated information with various thresholds to determine the reliability of the data associated with the cell. The prediction system 328 can determine whether the data indicative of the pattern of behavior is reliable in various way. For instance, in at least one example, if the data is associated with a co-variance matrix indicating the variation of previous entity behaviors, the prediction system 328 can compare information associated with the co-variance matrix with a threshold. Based at least in part on determining that the information associated with the co-variance matrix satisfies the threshold, the prediction system 328 can determine that the data indicative of the pattern of behavior is reliable. Additionally and/or alternatively, if the data is associated with a confidence value indicating a likelihood that the entity will behave as indicated, the prediction system 328 can compare the confidence value with a threshold confidence value. Based at least in part on determining that the confidence value meets or exceeds the threshold confidence value, the prediction system 328 can determine that the data indicative of the pattern of behavior is reliable. Furthermore, if the data is based on a data sample having a particular number of observations, as described above, the prediction system 328 can compare the number of observations with a threshold number of observations. Based at least in part on determining that the number of observations meets or exceeds the threshold number of observations, the prediction system 328 can determine that the data indicative of the pattern of behavior is reliable and can determine a predicted behavior of an entity based on the pattern of behavior.

Block 708 illustrates determining a predicted behavior of the entity based at least in part on the pattern of behavior. Based at least in part on determining that the data indicative of the pattern of behavior is determined to be reliable, the prediction system 328 can determine a predicted behavior based on the pattern of behavior. Then, the vehicle 302 can use the pattern of behavior to inform various systems of the vehicle 302. As described above, in at least one example, the predicted behavior can be used to inform the perception system 322 for performing entity detection, segmentation, and/or classification (e.g., in an example, a heat map can be used for performing an inverse look-up to determine an entity type). Additionally and/or alternatively, the planning system 324 can utilize the predicted behavior for determining a trajectory along which the vehicle 302 can travel. The planning system 324 can send the trajectory to the system controller(s) 326, which can execute the trajectory to cause the vehicle 302 to drive along the trajectory (e.g., in the example of an autonomous vehicle). Additionally and/or alternatively, the predicted behavior can be used for weighting trajectories generated by the planning system 324 that can determine routes and/or trajectories to use to control the vehicle 302. Furthermore, the predicted behavior can be used to inform a neural network that can be used to predict behavior(s) of entity(s). In additional and/or alternative examples, the pattern of behavior associated with the cell of the heat map 330 can be used as a decent prior.

Block 710 illustrates refraining from determining a predicted behavior of the entity based at least in part on the pattern of behavior. Based at least in part on determining that the data indicative of the pattern of behavior is not reliable, the prediction system 328 can determine not to use the pattern of behavior for determining the predicted behavior.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A. One or more systems comprising: one or more processors; and one or more computer-readable media storing instructions executable by the one or more processors, wherein the instructions program the one or more processors to: receive first sensor data from one or more first sensors in an environment; associate the first sensor data with a heat map; receive second sensor data from one or more second sensors associated with a vehicle in the environment; determine, based at least in part on the second sensor data, a presence of a first entity, the first entity associated with a first entity type and a first entity location; access heat map data from the heat map based at least in part on the first entity type and the first entity location; determine, based at least in part on the heat map data, a predicted behavior of the first entity; and determine, based at least in part on the predicted behavior, a trajectory for the vehicle to travel in the environment.

B. The one or more systems as paragraph A recites, wherein the first sensor data is received over time from a fleet of vehicles.

C. The one or more systems as paragraph A or B recite, wherein associating the first sensor data with the heat map is based at least in part on: detecting a second entity from the first sensor data, the second entity having a same entity type as the first entity type; determining, from the first sensor data, a second entity location of the second entity, the second entity location corresponding to the first entity location; determining, from the first sensor data, at least one characteristic associated with at least one of the second entity or a state of the environment; and determining, from the first sensor data, a behavior associated with the second entity.

D. The one or more systems as paragraph C recites, wherein associating the first sensor data with the heat map is further based at least in part on: aggregating a first observation representative of the behavior associated with the second entity with second observations representative of behaviors of a plurality of third entities to generate a set of observations associated with the second entity location and the at least one characteristic, the plurality of third entities having a same entity type as the first entity type; generating a probability distribution based on the set of observations, the probability distribution representing respective behaviors of entities having the same entity type, that are associated with the at least one characteristic, and that are associated with the second entity location; determining a representative behavior based on the probability distribution; identifying a cell in the heat map based at least in part on the second entity location and the at least one characteristic; and associating data associated with the representative behavior with the cell in the heat map as the heat map data.

E. The one or more systems as paragraph D recites, wherein the representative behavior comprises at least one of: a pose; an intended destination; a movement; or a semantic action.

F. The one or more systems as any of paragraphs A-E recite, wherein determining the predicted behavior of the first entity comprises: determining, from the second sensor data, at least one characteristic associated with at least one of the first entity or a state of the environment; identifying a cell in the heat map based on the first entity location, the first entity type, and the at least one characteristic associated with at least one of the first entity or the state of the environment; and retrieving, from the cell in the heat map, the heat map data, the heat map data being representative of a behavior.

G. The one or more systems as paragraph F recites, wherein the at least one characteristic comprises at least one of: a velocity of the first entity; an orientation of the first entity; a time of day; a day of a week; a season; a weather condition; or an indication of darkness.

H. The one or more systems any of paragraphs A-G recite, wherein the first entity location corresponds to an area of the environment determined based on global positioning system coordinates.

I. A method comprising: receiving, at a computing device, sensor data associated with an environment; determining, based at least in part on the sensor data, a presence of an entity in the environment; determining, based at least in part on the sensor data, a first characteristic associated with the entity or the environment; accessing a heat map generated from previously collected sensor data associated with the environment; and determining, based at least in part on the heat map, a predicted behavior of the entity at a predetermined future time.

J. The method as paragraph I recites, wherein determining the predicted behavior comprises: locating a cell in the heat map, the cell having an index associated with a location of the entity and the first characteristic; and retrieving data indicative of a pattern of behavior from the cell, the pattern of behavior determined based at least in part on the previously collected sensor data.

K. The method as paragraph J recites, wherein the data indicative of the pattern of behavior is associated with a confidence value indicating a probability that the entity conforms to the pattern of behavior, and the method further comprises: determining that the confidence value meets or exceeds a threshold value; and determining the predicted behavior based at least in part on the pattern of behavior.

L. The method as any of paragraphs I-K recite, wherein the data indicative of the pattern of behavior is associated with information associated with a co-variance matrix, and the method further comprises: determining that the information associated with the co-variance matrix satisfies a threshold; and determining the predicted behavior based at least in part on the pattern of behavior.

M. The method as any of paragraphs I-L recite, wherein the data indicative of the pattern of behavior is determined based on a number of observations, and the method further comprises: determining that the number of observations meets or exceeds a threshold number; and determining the predicted behavior based at least in part on the pattern of behavior.

N. The method as any of paragraphs I-M recite, further comprising: accessing a plurality of heat maps stored in one or more databases; selecting the heat map from the plurality of heat maps based at least in part on the first characteristic; determining, based at least in part on the sensor data, a second characteristic associated with the entity or the environment; locating a cell in the heat map, the cell having an index associated with a location of the entity and the second characteristic; retrieving data indicative of a pattern of behavior from the cell, the pattern of behavior determined based at least in part on the previously collected sensor data; and determining the predicted behavior based at least in part on the pattern of behavior.

O. The method as any of paragraphs I-N recite, further comprising: determining, by the computing device(s), a trajectory along which a vehicle is to drive based at least in part on the predicted behavior of the entity; and sending the trajectory to a controller to cause the vehicle to drive along the trajectory.

P. The method as paragraph O recites, wherein the computing device(s) is associated with an autonomous vehicle, and sending the trajectory to the controller causes the autonomous vehicle to follow the trajectory.

Q. A non-transitory computer-readable medium storing instructions that, when executed, cause one or more processors to perform operations comprising: receiving sensor data from one or more sensors; determining, based at least in part on the sensor data, first data indicative of a behavior associated with an entity in an environment and a location of the entity; determining, based at least in part on the first data, second data representative of a pattern of behavior associated with one or more entities having a same entity type as the entity; and associating the second data with a heat map based at least in part on: determining a cell associated with the location of the entity; and associating the second data with the cell, the second data being used at a subsequent time for determining a predicted behavior of an observed entity, of the same entity type, in the location.

R. The non-transitory computer-readable medium as paragraph Q recites, the operations further comprising: determining, based at least in part on the sensor data, one or more characteristics associated with the entity; and determining the cell based at least in part on the location of the entity and the one or more characteristics.

S. The non-transitory computer-readable medium as paragraph Q or R recites, wherein the first data represents a first observation, and determining the second data is based at least in part on: determining, based at least in part on the sensor data, at least one second observation associated with another entity of the one or more entities, the other entity associated with the location and the same entity type; determining a probabilistic distribution based at least in part on the first observation and the second observation; and determining the pattern of behavior based at least in part on the probabilistic distribution.

T. The non-transitory computer-readable medium as paragraphs Q-S recite, the operations further comprising determining an area of the environment to which the cell corresponds based at least in part on global positioning system coordinates or a semantic map.

While paragraphs A-H are described above with respect to a system, it is understood in the context of this document that the content of paragraphs A-H may also be implemented via a method, device, and/or computer storage media. While paragraphs I-P are described above with respect to a method, it is understood in the context of this document that the content of paragraphs I-P may also be implemented via a system, device, and/or computer storage media. While paragraphs Q-T are described above with respect to a non-transitory computer-readable medium, it is understood in the context of this document that the content of paragraphs Q-T may also be implemented via a method, device, and/or system.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. One or more systems comprising:
one or more processors; and
one or more computer-readable media storing instructions executable by the one or more processors, wherein the instructions program the one or more processors to:
receive first sensor data from one or more first sensors in an environment;
associate the first sensor data with a heat map, the heat map comprising a cell representing an area of the environment;
receive second sensor data from one or more second sensors associated with a vehicle in the environment;
determine, based at least in part on the second sensor data, a presence of a first entity, the first entity associated with a first entity type and a first entity location;
access heat map data from the heat map based at least in part on the first entity location being within the area of the environment represented by the cell, the heat map data indicating a probability of a representative behavior of the first entity for the area represented by the cell;
determine, based at least in part on the representative behavior indicated by the heat map data, a predicted behavior of the first entity; and
determine, based at least in part on the predicted behavior, a trajectory for the vehicle to travel in the environment.

2. The one or more systems as claim 1 recites, wherein the first sensor data is received over time from a fleet of vehicles.

3. The one or more systems as claim 1 recites, wherein associating the first sensor data with the heat map is based at least in part on:
detecting a second entity from the first sensor data, the second entity having a same entity type as the first entity type;
determining, from the first sensor data, a second entity location of the second entity, the second entity location corresponding to the first entity location;
determining, from the first sensor data, at least one characteristic associated with at least one of the second entity or a state of the environment; and
determining, from the first sensor data, a behavior associated with the second entity.

4. The one or more systems as claim 3 recites, wherein associating the first sensor data with the heat map is further based at least in part on:
aggregating a first observation representative of the behavior associated with the second entity with a second observation representative of a behavior of a third entity to generate a set of observations associated with the second entity location and the at least one characteristic, the third entity having a same entity type as the first entity type;
generating a probability distribution based at least in part on the set of observations, the probability distribution representing respective behaviors of entities having the same entity type, that are associated with the at least one characteristic, and that are associated with the second entity location;
determining the representative behavior based at least in part on the probability distribution;
identifying the cell in the heat map based at least in part on the second entity location and the at least one characteristic; and
associating data associated with the representative behavior with the cell in the heat map as the heat map data.

5. The one or more systems as claim 4 recites, wherein the representative behavior comprises at least one of:
a pose;
an intended destination;

a movement; or a semantic action.

6. The one or more systems as claim 1 recites, wherein determining the predicted behavior of the first entity comprises:
  determining, from the second sensor data, at least one characteristic associated with at least one of the first entity or a state of the environment;
  identifying the cell in the heat map based at least in part on the first entity location, the first entity type, and the at least one characteristic associated with at least one of the first entity or the state of the environment; and
  retrieving, from the cell in the heat map, the heat map data.

7. The one or more systems as claim 6 recites, wherein the at least one characteristic comprises at least one of:
  a velocity of the first entity;
  an orientation of the first entity; a time of day;
  a day of a week; a season;
  a weather condition; or an indication of darkness.

8. The one or more systems as claim 1 recites, wherein the first entity location corresponds to an area of the environment determined based at least in part on global positioning system coordinates.

9. A method comprising:
  receiving, at a computing device, sensor data associated with an environment;
  determining, based at least in part on the sensor data, a presence of an entity in the environment;
  determining, based at least in part on the sensor data, a first characteristic associated with the entity or the environment;
  accessing, based at least in part on the first characteristic associated with the entity or the environment, a heat map generated from previously collected sensor data associated with the environment, the heat map comprising a cell associated with a probability of a representative behavior of the entity for an area of the environment represented by the cell; and
  determining, based at least in part on accessing the heat map, a predicted behavior of the entity at a predetermined future time.

10. The method as claim 9 recites, wherein determining the predicted behavior comprises:
  locating the cell in the heat map, the cell having an index associated with a location of the entity and the first characteristic; and
  retrieving data indicative of a pattern of behavior from the cell, the pattern of behavior determined based at least in part on the previously collected sensor data.

11. The method as claim 10 recites, wherein the probability is a first probability, the data indicative of the pattern of behavior is associated with a confidence value indicating a second probability that the entity conforms to the pattern of behavior, and the method further comprises:
  determining the predicted behavior based at least in part on the pattern of behavior.

12. The method as claim 10 recites, wherein the data indicative of the pattern of behavior is associated with information associated with a co-variance matrix, and the method further comprises:
  determining that the information associated with the co-variance matrix satisfies a threshold; and
  determining the predicted behavior based at least in part on the pattern of behavior.

13. The method as claim 10 recites, wherein the data indicative of the pattern of behavior is determined based at least in part on a number of observations, and the method further comprises:
  determining that the number of observations meets or exceeds a threshold number; and
  determining the predicted behavior based at least in part on the pattern of behavior.

14. The method as claim 9 recites, further comprising:
  accessing a plurality of heat maps stored in one or more databases;
  selecting the heat map from the plurality of heat maps based at least in part on the first characteristic;
  determining, based at least in part on the sensor data, a second characteristic associated with the entity or the environment;
  locating the cell in the heat map, the cell having an index associated with a location of the entity and the second characteristic;
  retrieving data indicative of a pattern of behavior from the cell, the pattern of behavior determined based at least in part on the previously collected sensor data; and
  determining the predicted behavior based at least in part on the pattern of behavior.

15. The method as claim 9 recites, further comprising:
  determining, by the computing device, a trajectory along which a vehicle is to drive based at least in part on the predicted behavior of the entity; and
  sending the trajectory to a controller to cause the vehicle to drive along the trajectory.

16. The method as claim 15 recites, wherein the vehicle is an autonomous vehicle, and sending the trajectory to the controller causes the autonomous vehicle to follow the trajectory.

17. A non-transitory computer-readable medium storing instructions that, when executed, cause one or more processors to perform operations comprising:
  receiving sensor data from one or more sensors associated with a vehicle;
  determining, based at least in part on the sensor data, first data indicative of a behavior associated with an entity in an environment and a location of the entity;
  determining, based at least in part on the first data, second data representative of a pattern of behavior associated with one or more entities having a same entity type as the entity; and
  associating the second data with a heat map based at least in part on:
    determining a cell of the heat map corresponding to the location of the entity; and
    associating the second data representative of the pattern of behavior with the cell such that the cell represents a probability of the pattern of behavior of the entity for the location represented by the cell, the second data being used at a subsequent time for determining a predicted behavior of an observed entity, of the same entity type, in the location of the entity.

18. The non-transitory computer-readable medium as claim 17 recites, the operations further comprising:
  determining, based at least in part on the sensor data, one or more characteristics associated with the entity; and
  determining the cell based at least in part on the location of the entity and the one or more characteristics.

19. The non-transitory computer-readable medium as claim 17 recites, wherein the first data represents a first observation, and determining the second data is based at least in part on:

determining, based at least in part on the sensor data, at least one second observation associated with another entity of the one or more entities, the other entity associated with the location and the same entity type;

determining a probabilistic distribution based at least in part on the first observation and the second observation; and determining the pattern of behavior based at least in part on the probabilistic distribution.

20. The non-transitory computer-readable medium as claim 17 recites, the operations further comprising determining an area of the environment to which the cell corresponds based at least in part on global positioning system coordinates or a semantic map.

* * * * *